Feb. 26, 1957    K. W. BINDING    2,782,972
ARTICLE CARRIER ATTACHMENT
Filed July 13, 1955    2 Sheets-Sheet 1

Inventor
Kenneth W. Binding
by Roberts, Cushman & Grover
Attys

Feb. 26, 1957  K. W. BINDING  2,782,972
ARTICLE CARRIER ATTACHMENT
Filed July 13, 1955  2 Sheets-Sheet 2
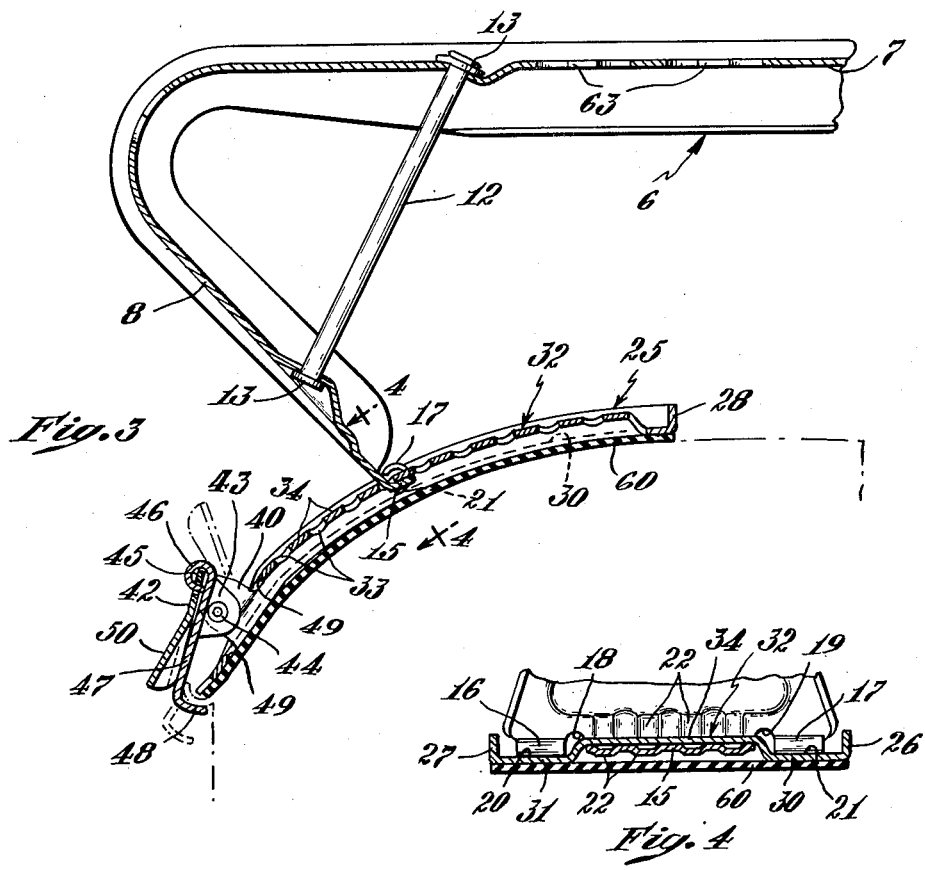
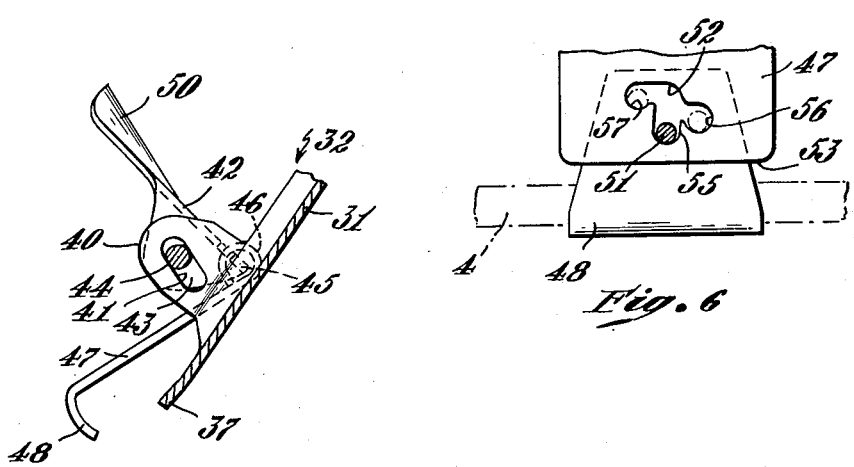
Inventor
Kenneth W. Binding
by Roberts, Cushman & Grover
Attys

United States Patent Office 2,782,972
Patented Feb. 26, 1957

2,782,972

ARTICLE CARRIER ATTACHMENT

Kenneth W. Binding, Winchester, Mass., assignor to Market Forge Company, Everett, Mass., a corporation of Massachusetts Application July 13, 1955, Serial No. 521,700

7 Claims. (Cl. 224—42.1)

This invention relates to an attachment for automobile tops for use in carrying articles such as luggage, lumber, ladders, boats, skis or the like.

Objects of the present invention are to provide a carrier attachment of the character described which possesses marked strength, durability, stability and carrying capacity and which, without sacrifice of the above desirable features, is readily adjustable to fit the tops of all commercial hard-top automobiles and is easily installed or removed therefrom without requiring the loosening or tightening of nuts, bolts, screws, straps and the like or the use of any tools.

Other objects of the invention are to provide a carrier attachment of the character described which is easy and economical to manufacture, which insures maximum protection to the automobile top both from injury resulting from excessive weight of the load carried and from scars and scratches, which, when installed on the automobile top, is securely fastened thereto without danger of accidental or inadvertent displacement, which requires no change, alteration or addition to conventional automobile top construction and which is pleasing in appearance.

In one aspect the invention involves an article carrier attachment for automobile tops of the type having longitudinally extending rain gutters, said attachment comprising a rigid cross bar of fixed length, each end of the bar bending downwardly and terminating in a claw, a plate disposed beneath each end of the bar for engagement with the automobile top, and means for clamping the plates to rain gutters, each plate having a plurality of claw-anchoring elements spaced transversely of the automobile top, each plate being adjustable relative to its claw to bring a selected one of said claw-anchoring elements into engagement with the claw, thereby to compensate for varying widths of automobile tops. Preferably the ends of the cross bar converge downwardly and in a more specific aspect the cross bar has a horizontal body portion, and a brace at each end of the cross bar interconnects the end with said body portion.

Each end of the cross bar may have bearing means at opposite sides of the claw and in a preferred aspect each plate has marginal side portions and an upwardly displaced platform intermediate said marginal side portions, said platform having a plurality of slots spaced transversely of the automobile top and defining a plurality of bars therebetween which constitute the claw-anchoring elements, each plate being adjustable relative to the claw to bring a selected one of said bars into anchoring engagement with the claw and with the bearing means bearing on said marginal side portions.

Each plate has a pivoted latch connected to the plate, the latch having a hook at its free end for engaging the underside of the gutter and a toggle operable to draw the hook into clamping engagement with the gutter, thereby to clamp the plate to the gutter, and in a more specific aspect the latch at its free end may have an aperture with a plurality of interconnected branches, each branch being being spaced at different distances from the outer extremity of the latch, the hook having a pin pivotally mounted in said aperture and slidably movable into selected ones of said branches for varying the distance of the extremity of the hook from said latch extremity. Preferably each plate has a pair of spaced upturned ears each formed with a slot extending in a direction toward the automobile top, a toggle element disposed between said ears and pivot pins slidably mounted in said slots and pivotally interconnecting the ears with the toggle element at opposite sides thereof, the latch being pivotally connected to the inner end of the toggle element.

For the purposes of illustration a preferred embodiment of the invention is shown in the accompanying drawings in which:

Fig. 3 is a section on the line 3—3 of Fig. 2;

Fig. 4 is a section on the line 4—4 of Fig. 3;

Fig. 5 is a fragmentary side elevation partly in section showing the toggle element in partially open position; and Fig. 6 is a fragmentary end elevation of a modified form of latch.

Figures 1, 2:
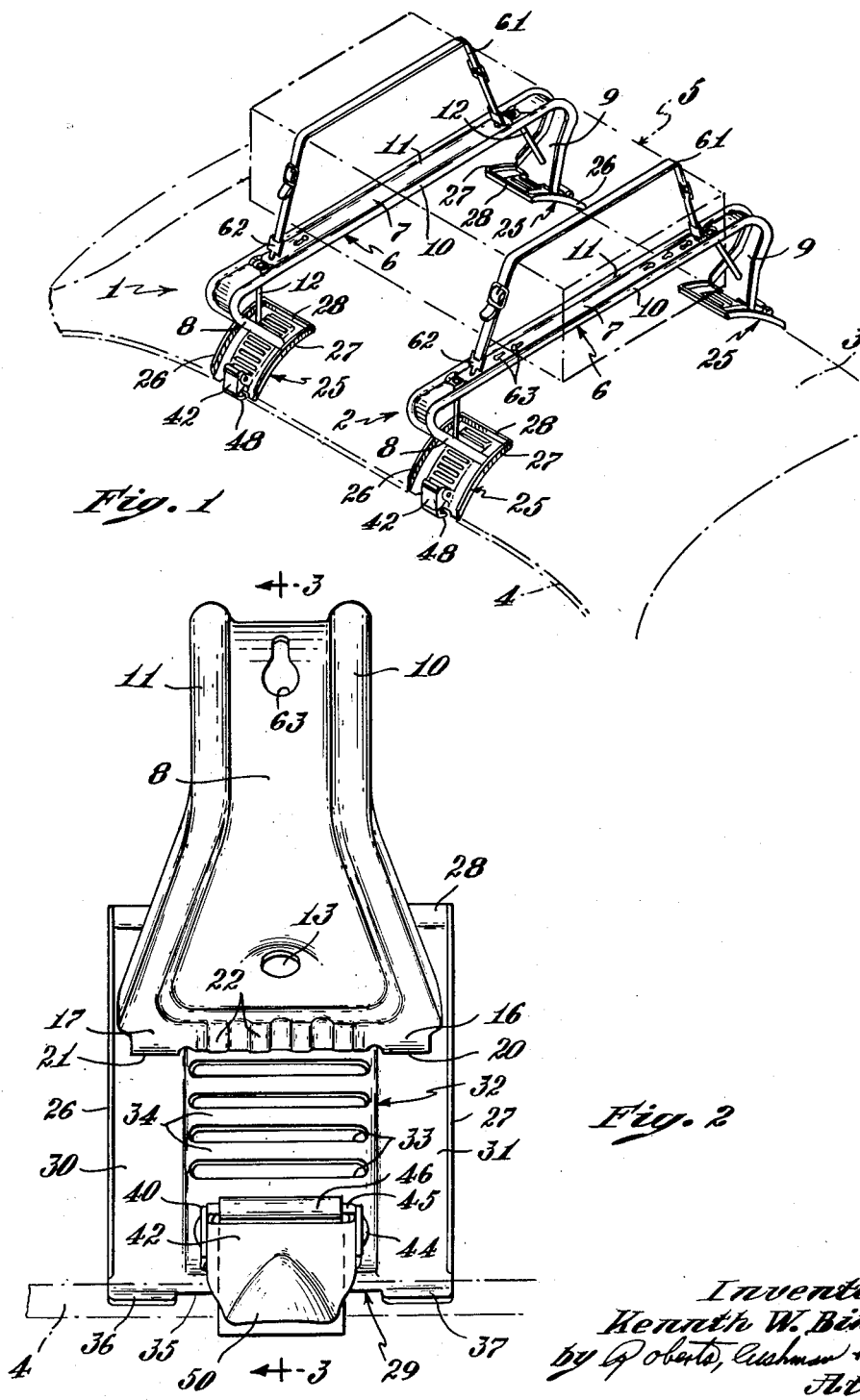
Fig. 1 is a perspective view showing the carrier attachment installed on an automobile top.
Fig. 2 is an end elevation, on an enlarged scale, of one end of one unit of the carrier attachment of Fig. 1.

Referring now more particularly to the drawings, the article carrier attachment comprises two separate carrier units 1 and 2 which, as shown in Fig. 1, are mounted on a conventional automobile top 3 having longitudinally extending rain gutters 4 at opposite sides thereof, the carrier units jointly supporting an article 5 shown in phantom.

As each of the carrier units are identical in construction, only unit 1 will be described in detail and comprises a rigid cross bar 6 of suitable strong but light material, as for example, a single piece of uniform gauge sheet metal, the cross bar being of fixed length and substantially bridge-shaped in side elevation and having an elevated relatively narrow elongate horizontal body portion 7 and downwardly converging outwardly splayed ends 8 and 9, the ends being of sufficient height to support the body portion in spaced relation to the automobile top. To provide additional strength to the cross bar the body portion and ends are formed with longitudinally extending beads 10 and 11 and at each end of the bar the end is interconnected with the body portion by a brace 12 the ends of which brace extend through suitable openings formed in the end and body portions and are provided with locking heads 13 (Fig. 3).

Each end 8 and 9 of the cross bar terminates in a claw here shown by way of example as an inwardly turned hook 15 (Fig. 3) disposed intermediate the marginal side portions 16 and 17 of said end and spaced therefrom by means of recesses 18 and 19, the marginal side portions being curled inwardly to form bearings 20 and 21 (Fig. 4). To add strength to the hook 15 and the adjacent portion of the end of the cross bar they are formed with transversely spaced longitudinally extendings ribs 22.

Disposed beneath the ends 8 and 9 of the bar are plates 25 for engagement with the conventional rounded shoulders of an automobile top adjacent the rain gutter, each plate being substantially rectangular in shape and elongate in a direction transversely of the automobile top and being upwardly convex in cross section in said direction generally to conform to the contour of said rounded shoulders, the plates having side edges 26 and 27 and ends 28 and 29, the side edges and end 28 being formed with an upstanding flange to strengthen the plate.

Intermediate its marginal side portions 30 and 31, but terminating short of its ends 28 and 29, each plate is formed with an upwardly displaced elongate portion constituting a platform 32 (Figs. 2, 3 and 4). The platform is formed with a plurality of slots 33 of a length slightly greater than the width of the hook 15 and spaced transversely of the automobile top to define a plurality of similarly spaced bars 34 which constitute claw-anchoring elements, each slot being adapted to receive the hook 15 to permit the hook to be brought into anchoring engagement with the next adjacent bar 34 (Figs. 2, 3 and 4). When thus anchored, the portion of the platform defining the ends of the slot are accommodated in the recesses 18 and 19 formed in the claw and the bearings 20 and 21 bear upon the marginal side portions 31 and 30, respectively, of the plate thereby to prevent rocking movement of the end of the cross bar relative to the plate.

At its end 29 each plate 25 is formed with a recess 35 intermediate the marginal side portions 30 and 31, the marginal side portions at said end thereby forming outwardly extending legs 36 and 37 which are adapted to be seated in the rain gutter (Fig. 2).

The upward displacement of the platform 32 and the provision of the recess 35 provides spaces to accommodate any upwardly convex surface of the rounded shoulders of the automobile top longitudinally of the top and intermediate the marginal side portions of the plate, thereby to insure firm seating of the plate on the automobile top and to eliminate any rocking of the plate relative to the top.

Adjacent the end 29 of the plate, the platform 32 is provided with spaced upstanding ears 40 each formed with a slot 41 extending toward the automobile top (Fig. 5). A toggle element 42 having side walls 43 is disposed between said ears and a pivot pin 44 extends through the side wall 43 on each side of the toggle and is slidably received in the slot 41, thereby pivotally to mount the toggle to the ears and to permit free movement of the pivotal axis of the toggle toward and away from the automobile top for a purpose hereinafter to be described.

At its inner end the toggle element is formed with a transverse bar 45 adapted to be pivotally engaged by the curled end 46 of a latch 47, the latch being adapted to extend outwardly beyond the plate and over the rain gutter and having a hook 48 at its free end adapted to engage the underside of the gutter. With reference to Fig. 3, movement of the toggle about the pivot pins 44, from its closed position shown in full lines to its open position shown in dash lines, causes the latch to pivot about the bar 45 to move the hook 48 further beyond the plate from the position shown in full lines to the position shown in dash lines. The platform 32 intermediate the ears 40 is formed with an aperture 49 to accommodate the inner end of the toggle and curled end 46 of the latch during the movement of the toggle from closed to open position. The toggle is provided at its outer end with an upwardly convex portion 50 to provide a recess between the toggle and latch when the toggle is in closed position for the reception of the thumb of the operator when he desires to open the toggle.

In the modification of Fig. 6 in which like parts have wherever possible been given the same reference numerals, the latch 47 and its hook 48 are formed in two parts, the hook having an upstanding pin 51 pivotally received in an aperture 52 formed adjacent the free end 53 of the latch. The aperture 52 has a plurality of interconnecting branches 55, 56 and 57, each branch being spaced at a different distance from said free end 53 of the latch. The pin is slidably movable into selected ones of said branches for varying the distance of the extremity of the hook 48 from the free end 53 of the latch, thereby to provide for a finer adjustment between the hook and the underside of the rain gutter to compensate for variations in the size and contour of automobile rain gutters.

In order to prevent scarring or scratching of the automobile top by the plates 25, a suitable pad 60, preferably of rubber, is secured to the undersurface of the plate by suitable means as adhesive.

Suitable means for securing articles disposed on the carrier bars 6 are here shown by way of example as straps 61 having fastening elements 62 adapted to be engaged and locked in selected ones of a plurality of apertures 63 spaced longitudinally of the cross bars.

In one manner of installing the article carrier attachment above described, the four plates 25 may be disposed on the automobile top in the manner shown in Fig. 1 with the legs 36 and 37 of the plates seated in the rain gutters, the toggles 42 being in their open position (Fig. 3) and the latch hooks 48 being in their extended position shown in dash lines in Fig. 3 and overlying the undersides of the rain gutters. The cross bars 6 are then centered over the automobile top with their claws resting on the plates 25. The claws at the ends 9 of the cross bars are then anchored to their plates by inserting their hooks 15 through the slots 33 nearest to the point where the claws were resting and then bringing said hooks into anchoring engagement with the bars 34 next adjacent said slots. The toggles 42 are then pivoted to their closed position shown in Fig. 3 to draw the latch hooks 48 into clamping engagement with the underside of the gutters, thereby to clamp the plates to the gutters as shown in Figs. 1 and 2.

The claws at the ends 8 of the cross bars are then brought into anchoring engagement with their plates by first moving the plates inwardly and transversely of the automobile top until the outer ends of the legs 36 and 37 are slightly withdrawn from the gutters. The hooks 15 of the claws are then inserted into the slots 33, then beneath the hooks 15, and are brought into anchoring engagement with the bars 34 next adjacent said slots. Thereafter the toggles 42 are similarly pivoted to closed position to draw the latch hooks 48 into clamping engagement with the undersides of the gutters which in turn causes the plates to be drawn outwardly toward the gutters and the legs 36 and 37 to again be seated in the gutters, thereby to clamp the plates to the gutters.

To remove the article carrier attachment it is only necessary to pivot the toggles 42 to open position, thereby to release the latch hooks 48 from clamping engagement with the gutters, after which the cross bars may be lifted from the automobile top with the plates still anchored thereto.

From the foregoing it is obvious that by movement of the plates transversely of the automobile top to bring the hooks 15 of the claws into anchoring engagement with selected bars 34 of the plates, adjustment of the carrier attachment to compensate for varying widths of automobile tops is quickly and simply accomplished without requiring the use of any tools or the laborious loosening and tightening of nuts, screws, bolts, straps, or the like.

Free movement of the pivotal axes of the toggles 42 toward and away from the automobile top not only provides for automatic adjustment of the contour of the latch hook 48 to varying contours of rain gutter undersides, thereby to insure a firm clamping engagement of the latch hooks with the gutters, but also provides for automatic adjustment of the pivotal axes of the toggles relative to the automobile to compensate for varying relative positions of the gutters and adjacent portions of automobile tops to each other, thereby to facilitate closing of the toggles.

It should be understood that the present disclosure is for the purpose of illustration only and that this invention includes all modifications and equivalents which fall within the scope of the appended claims.

I claim:

1. An article carrier attachment for automobile tops of the type having longitudinally extending rain gutters, said attachment comprising a rigid cross bar of fixed length, each end of the cross bar bending downwardly and terminating in a claw, a plate disposed beneath each end of the cross bar for engagement with the automobile top, and means for clamping the plates to the rain gutters, each plate having a series of claw-anchoring elements spaced transversely of the automobile top, the claw being engageable with any one of said claw-anchoring elements depending on the width of the automobile top.

2. An article carrier attachment according to claim 1 wherein each end of the cross bar has bearing means at opposite sides of the claw which bear upon the plate, when the claw is in engagement with any one of said anchoring elements, to prevent rocking of the cross bar relative to the plate.

3. An article carrier attachment according to claim 1 wherein each plate has a series of bars spaced transversely of the automobile top which constitute the claw-anchoring elements, the claw being engageable with any one of said bars depending on the width of the automobile top.

4. An article carrier attachment according to claim 1 wherein each plate has a pivoted latch connected to the plate, the latch having a hook at its free end for engaging the underside of the gutter, and a toggle operable to draw the hook into clamping engagement with the gutter, thereby to clamp the plate to the gutter.

5. An article carrier attachment for automobile tops of the type having longitudinally extending rain gutters, said attachment comprising a rigid cross bar of fixed length, each end of the cross bar bending downwardly and terminating in a claw and having bearing means at opposite sides of the claw, a plate disposed beneath each end of the cross bar for engagement with the automobile top, and means for clamping the plates to the rain gutters, each plate having marginal side portions and an upwardly displaced platform intermediate said marginal side portions, said platform having a plurality of slots spaced transversely of the automobile top and defining a plurality of bars therebetween, constituting claw-anchoring elements, each plate being adjustable relative to its claw to bring a selected one of said bars into anchoring engagement with the claw, thereby to compensate for varying widths of automobile tops, the bearing means bearing on said marginal side portions of the plate when the claw is in engagement with the selected one of said anchoring elements, thereby to prevent rocking of the cross bar relative to the plate.

6. An article carrier attachment for automobile tops of the type having longitudinally extending rain gutters, said attachment comprising a rigid cross bar of fixed length, each end of the cross bar bending downwardly and terminating in a claw, a plate disposed beneath each end of the cross bar for engagement with the automobile top, each plate having a plurality of claw-anchoring elements spaced transversely of the automobile top, each plate being adjustable relative to the claw to bring a selected one of said claw-anchoring elements into engagement with the claw, thereby to compensate for varying widths of automobile tops, each plate having a pivoted latch connected to the plate, the latch at its free end having an aperture with a plurality of interconnected branches, each branch being spaced at a different distance from the outer extremity of the latch, a hook for engaging the underside of the gutter and having a pin pivotally mounted in said aperture and slidably movable into selected ones of said branches for varying the distance of the extremity of the hook from said latch extremity, and a toggle operable to draw the hook into clamping engagement with the gutter, thereby to clamp the plate to the gutter.

7. An article carrier attachment for automobile tops of the type having longitudinally extending rain gutters, said attachment comprising a rigid cross bar of fixed length, each end of the cross bar bending downwardly and terminating in a claw, a plate disposed beneath each end of the cross bar for engagement with the automobile top, each plate having a plurality of claw-anchoring elements spaced transversely of the automobile top, each plate being adjustable relative to the claw to bring a selected one of said claw-anchoring elements into engagement with the claw, thereby to compensate for varying widths of automobile tops, each plate having a pair of spaced upturned ears each formed with slots extending in a direction toward the automobile top, a toggle element disposed between said ears and pivot pins slidably mounted in said slots and pivotally interconnecting the ears with the toggle element at opposite sides thereof, and a latch pivotally connected to the inner end of the toggle element and having a hook at its free end for engaging the underside of the gutter, the toggle being operable to draw the hook into clamping engagement with the gutter thereby to clamp the plate to the gutter.

References Cited in the file of this patent

UNITED STATES PATENTS

| | | |
|---|---|---|
| 2,434,387 | Brandt | Jan. 13, 1948 |
| 2,575,458 | Merrill | Nov. 20, 1951 |
| 2,663,472 | Belgau | Dec. 22, 1953 |